United States Patent [19]
Jahn et al.

[11] Patent Number: 5,174,600
[45] Date of Patent: Dec. 29, 1992

[54] MOTOR VEHICLE WITH A SAFETY BELT AND AN AIRBAG SYSTEM

[75] Inventors: Walter Jahn, Ehningen; Luigi Brambilla, Böblingen, both of Fed. Rep. of Germany

[73] Assignee: Mercedes-Benz AG, Fed. Rep. of Germany

[21] Appl. No.: 777,582

[22] Filed: Oct. 16, 1991

[30] Foreign Application Priority Data

Oct. 16, 1990 [DE] Fed. Rep. of Germany ....... 4032757

[51] Int. Cl.⁵ .............................................. B60R 21/18
[52] U.S. Cl. .................................... 280/733; 180/268
[58] Field of Search ............... 180/268, 282; 280/733, 280/734

[56] References Cited

U.S. PATENT DOCUMENTS

| | | | |
|---|---|---|---|
| 4,620,721 | 11/1986 | Scholz et al. | 180/268 |
| 4,984,651 | 1/1991 | Grosch et al. | 280/733 |
| 5,067,744 | 11/1991 | Hirabayashi | 280/734 |
| 5,071,160 | 12/1991 | White et al. | 180/268 |

FOREIGN PATENT DOCUMENTS

| | | | |
|---|---|---|---|
| 2516185 | 10/1975 | Fed. Rep. of Germany. | |
| 3413768 | 7/1985 | Fed. Rep. of Germany. | |
| 0018135 | 1/1990 | Japan | 280/734 |
| 1332051 | 10/1973 | United Kingdom | 280/733 |

*Primary Examiner*—Charles A. Marmor
*Assistant Examiner*—Tamara L. Graysay
*Attorney, Agent, or Firm*—Evenson, Wands, Edwards, Lenahan & McKeown

[57] ABSTRACT

A motor vehicle is disclosed having a safety belt assigned to a seat and having an airbag system which is assigned to the same seat and has a pressure gas source which can be actuated by means of a deceleration sensor. In order to optimize protection for the seat user in the event of an accident, the invention proposes that at least two pressure gas sources which can be actuated independently of one another are provided, and in that in the event of an accident only one pressure gas source can be actuated by means of the deceleration sensor when the safety belt is being worn, while when the safety belt is not being worn all the pressure gas sources can be actuated so that it is only in this case that the maximum airbag internal pressure is available.

3 Claims, 1 Drawing Sheet

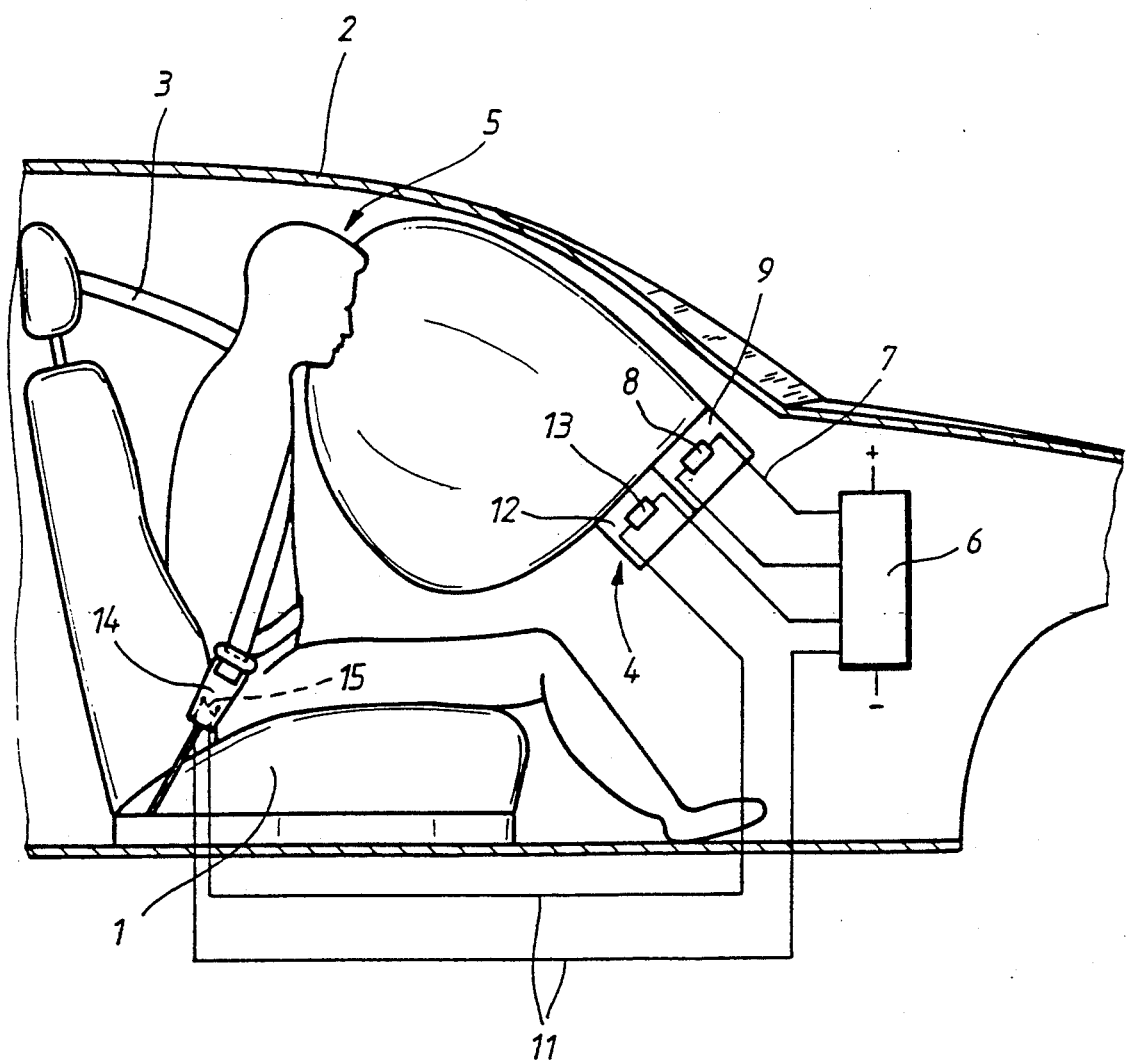

MOTOR VEHICLE WITH A SAFETY BELT AND AN AIRBAG SYSTEM

BACKGROUND OF THE SUMMARY OF THE INVENTION

The invention relates to a motor vehicle having a safety belt assigned to a seat and having an airbag system which is assigned to the same seat and has a pressure gas source which can be actuated by means of a deceleration sensor.

However, such a per se optimum combination of safety belt and airbag still has the disadvantage that with the airbag fully inflated a stronger restraining effect than is actually required and thus an unnecessarily large stressing of the body results for a vehicle occupant wearing a safety belt. However, on the other hand the internal pressure of the airbag cannot simply be reduced because then it would no longer be ensured that a vehicle occupant not wearing a safety belt did not impact against hard vehicle components in the event of an accident.

The present invention is based on the object of providing a remedy for this.

This object is achieved according to the invention in that at least two pressure gas sources which can be actuated independently of one another are provided, and in that in the event of an accident only one pressure gas source can be actuated by means of the deceleration sensor when the safety belt is being worn, whilst when the safety belt is not being worn all the pressure gas sources can be actuated so that it is only in this case that the maximum airbag internal pressure is available.

Other objects, advantages and novel features of the present invention will become apparent from the following detailed description of the invention when considered in conjunction with the accompanying drawings.

BRIEF DESCRIPTION OF THE DRAWINGS

The single drawing figure schematically depicts a vehicle seatbelt and airbag system constructed according to a preferred embodiment of the invention.

DETAILED DESCRIPTION OF THE DRAWINGS

The seat 1, illustrated in the drawing, of a motor vehicle 2, which is otherwise only outlined, is assigned both a safety belt 3 and an airbag system 4 in order to ensure an adequate protection of the seat user 5 in the event of an accident.

The airbag unit 4 is constructed in such a way that in the event of an accident a first circuit 7 is closed in any event by means of a sensor 6 operating in a deceleration-dependent manner, which circuit actuates a first pressure gas source 9 by means of a trigger device 8, which leads to a gas cushion being inflated with a specific pressure. The pressure gas source can either be formed by a gas generator or else even by a stored pressure gas supply.

Apart from the first circuit 7 described above, a second circuit 11, a second pressure gas source 12 and a second trigger device 13 are provided. However, this second circuit 11 can only be closed if the seat user 5 has not put on the safety belt 3 because a switch 15 arranged in the lock of the belt 14 is then closed. (This position of the switch 15 is not illustrated in the drawing).

Instead, in the drawing the situation with the safety belt 3 being worn is shown. In this case, the switch 15 is opened by the lock tongue (not illustrated) which is inserted into the lock of the belt 14 so that the circuit 11 remains open and the second pressure gas source 12 cannot be actuated.

Therefore, both pressure gas sources are only actuated if the seat user has not put on the safety belt and only in the case can the maximum internal pressure of the gas cushion be achieved.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Motor vehicle having a safety belt assigned to a seat and having an airbag system which is assigned to the same seat and has a pressure gas source which can be actuated by means of a deceleration sensor, wherein at least two pressure gas sources which can be actuated independently of one another are provided, and wherein, in the event of an accident only one pressure gas source can be actuated by means of the deceleration sensor when the safety belt is being worn, whilst when the safety belt is not being worn all the pressure gas sensors can be actuated so that it is only in this case that the maximum airbag internal pressure is available.

2. Safety belt and airbag system for protecting a passenger in a vehicle seat in the event of an accident, comprising:

airbag means assigned to a passenger seat,
   a plurality of pressure gas sources which can be actuated independently of one another and serve to inflate the airbag means,
   a deceleration sensor for sensing vehicle decelerations above a predetermined value which correspond to a vehicle collision and for emitting a control signal to activate the pressure gas sources,
   a seatbelt detection switch for detecting whether a passenger seatbelt at the passenger seat is being worn,
   and a control circuit for actuating the pressure gas sources such that less airbag inflation pressure is supplied to the airbag means when the seatbelt is being worn than when the seatbelt is not being worn.

3. System according to claim 2, wherein the airbag means is a single airbag, wherein two of said gas generators are provided, and wherein only one of the gas generators is actuated when the seatbelt is being worn and both gas generators are actuated when the seatbelt is not being worn.

* * * * *